United States Patent
Azuma et al.

(10) Patent No.: US 6,744,539 B1
(45) Date of Patent: Jun. 1, 2004

(54) SOLID-STATE IMAGE PICK-UP APPARATUS, DRIVING METHOD THEREFOR, AND IMAGE INPUT APPARATUS

(75) Inventors: Toshiaki Azuma, Kanagawa (JP); Katsunori Noguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 602 days.

(21) Appl. No.: 09/762,623

(22) PCT Filed: Jun. 8, 2000

(86) PCT No.: PCT/JP00/03735
§ 371 (c)(1),
(2), (4) Date: Jul. 19, 2001

(87) PCT Pub. No.: WO00/76200
PCT Pub. Date: Dec. 14, 2000

(30) Foreign Application Priority Data

Jun. 9, 1999 (JP) .......................... P11-162160
May 31, 2000 (JP) ......................... 2000-162289

(51) Int. Cl.⁷ .......................... H04N 1/04; H04N 5/335
(52) U.S. Cl. ................. 358/483; 358/482; 250/208.1; 348/315; 348/312
(58) Field of Search .................. 358/482, 483, 358/514, 512, 513; 348/230.1, 294, 300, 315, 312; 250/208.1; 257/241, 240, 249, 248; 377/60–63

(56) References Cited

U.S. PATENT DOCUMENTS

| | | | |
|---|---|---|---|
| 4,432,017 A | * 2/1984 | Stoffel et al. | 348/315 |
| 4,438,457 A | * 3/1984 | Tandon et al. | 348/315 |
| 4,540,901 A | 9/1985 | Suzuki | 257/248 |
| 4,712,137 A | 12/1987 | Kadekodi et al. | 348/316 |
| 5,274,687 A | 12/1993 | Hirama et al. | 377/60 |
| 5,452,003 A | 9/1995 | Chamberlain et al. | 348/294 |
| 5,751,444 A | * 5/1998 | Ward | 358/471 |
| 6,166,831 A | * 12/2000 | Boyd et al. | 358/483 |
| 6,462,779 B1 | * 10/2002 | Philbrick | 348/312 |

FOREIGN PATENT DOCUMENTS

| | | |
|---|---|---|
| EP | 0613289 | 8/1994 |
| GB | 2145600 | 3/1985 |
| JP | 04298175 | 10/1992 |
| JP | 9219824 | 2/1996 |
| JP | 9 321953 | 12/1997 |
| JP | 10-285343 | 10/1998 |
| JP | 10285343 | 10/1998 |
| JP | 11-164087 | 6/1999 |

OTHER PUBLICATIONS

Makoto Monoi, "A 5V CCD Linear Image Sensor" *IEEE 1992 Customer Integrated Circuits Conference*, Mar. 5, 1992, pp. 24.7.1–24.7.4.

* cited by examiner

Primary Examiner—Cheukfan Lee
(74) Attorney, Agent, or Firm—Sonnenschein, Nath & Rosenthal LLP

(57) ABSTRACT

In order to perform addition of the electric charges obtained from adjacent pixels in the same sensor row with a multiplexing structure type of solid-state image pick-up apparatus, a solid-state image pick-up apparatus of the present invention comprises: a first CCD register 10 that transfers electric charges acquired by a first light-receiving pixel row; a second CCD register 20 that transfers electric charges acquired by a second light-receiving pixel row; a multiplex section 30 that transfers the respective electric charges, transferred by the first CCD register 10 and second CCD register 20 toward a floating diffusion amplifier FD; and signal generator 3 that in the case of alternately-output mode, applies signals in opposite phase to each other to a final stage of the first CCD register 10 and a final stage of the second CCD register 20, respectively, and, in the case of an add-and-output mode, applies to the final stage of the second CCD register 20 a signal for accumulating the electric charge until a transfer time when the electric charges to be added to each other are transferred by the second CCD register 20 comes.

3 Claims, 4 Drawing Sheets

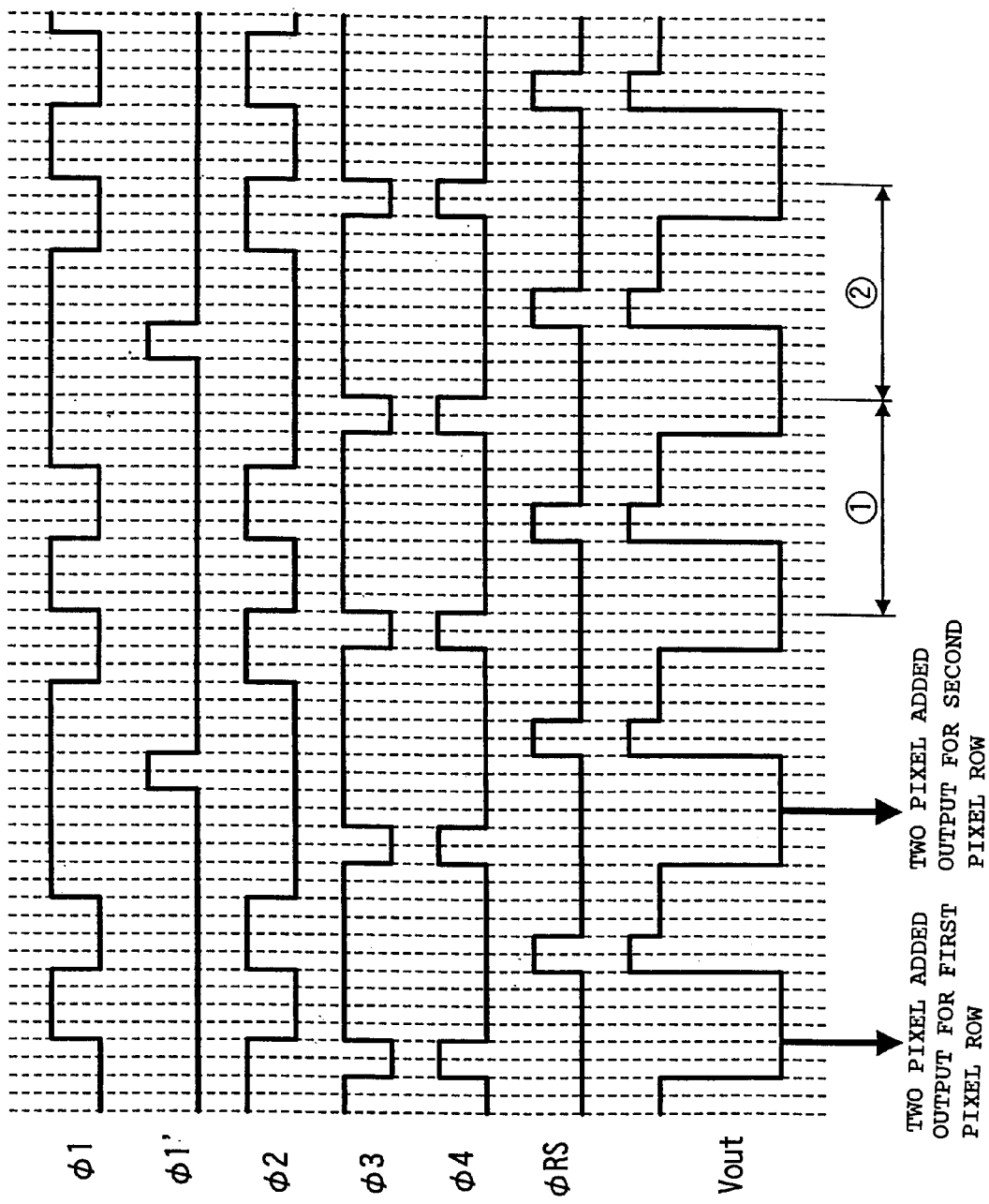

SOLID-STATE IMAGE PICK-UP APPARATUS, DRIVING METHOD THEREFOR, AND IMAGE INPUT APPARATUS

TECHNICAL FIELD

The present invention relates to a solid-state image pick-up apparatus that alternately transfers the electric charges acquired by a plurality of sensor rows to output them or that performs addition of the electric charges of pixels in the same row to output them, and also relates to a driving method therefor and an image input apparatus.

BACKGROUND ART

An image input apparatus that is applied to a scanner or a copier uses, a solid-state image pick-up apparatus having a linear sensor, and inputs an image, by scanning the read position of the solid-state image pick-up apparatus.

There has in recently years been a strong demand for the improvement of read resolution, and the increase of read speed. Regarding the linear sensor as well, there has hitherto been developed the one that copes with such demand by using a plurality of sensor rows. For example, in the solid-state image pick-up apparatus comprising two rows of sensors, one of the sensor rows and the other of them are arranged so as to be displaced from each other by a half pitch of the pixels. In order that, the electric charges acquired by one of the sensor rows and the electric charges acquired by the other of them may be multiplexed and alternately outputted.

Also, in case of outputting a signal obtained by adding the electric charges of pixels, the timing of a reset pulse signal for causing discharge of the electric charges of a floating diffusion amplifier that is electric-charge/voltage conversion means is controlled so that, the electric charges acquired from the pixels by both of the sensor rows and alternately transferred to the floating diffusion amplifier may be added there to each other and outputted therefrom.

However, when the addition of the electric charges is performed by the floating diffusion amplifier in the multi-plexing structure type of solid-state image pick-up apparatus as described above, after the electric charges acquired by one of the sensor rows have been transferred to the floating diffusion amplifier, the electric charges acquired by the other thereof are transferred to be added there. Therefore, it is impossible to obtain the added output until the electric charges acquired by the other of the sensor rows has been transferred to the floating diffusion amplifier, with the result that a time period for the added output is shortened. Consequently, a problem is raised that signal processing in the succeeding stage will be difficult to perform. Moreover, as compared to the case where the electric charges acquired by both of the two sensor rows are alternately outputted, a cyclic period for obtaining the added output becomes delayed or lengthened. Accordingly, another problem is raised that the technique of adding the electric charges cannot cope with the demand for speedy signal processing in the subsequent stage.

DISCLOSURE OF THE INVENTION

A solid-state image pick-up apparatus, a driving method therefor, and an image input apparatus according to the present invention have been developed in order to solve the above-described problems. Specifically, the solid-state image pick-up apparatus of the present invention comprises: a first charge transfer row for transferring electric charges acquired by a first light-receiving pixel row; a second charge transfer row for transferring electric charges acquired by a second light-receiving pixel row; a multiplex section for transferring the electric charges, transferred from the first charge transfer row and second charge transfer row toward an electric-charge/voltage conversion means, and signal generation means for, in case of an alternately output mode, applying signals to each other to a final stage of the first charge transfer row and a final stage of the second charge transfer row and that in the case of an add-and-output mode, applying to the final stage of the second charge transfer row a signal for accumulating the electric charges until a transfer time when the electric charges to be added to each other are transferred by the second charge transfer row comes.

In case of an add-and-output mode, the above-described present invention applies to the final stage of the second charge transfer row a signal for accumulating the electric charges until a transfer time when the electric charges to be added to each other are transferred by the second charge transfer row comes. Therefore, at a position before the final stage of the second charge transfer row there is performed accumulation, i.e. addition of the electric charges that have been transferred on by the second charge transfer row. Also, while the signal is being applied to the final stage of the second charge transfer row, the electric charges that have been transferred on by the first charge transfer row to the multiplex section are sent. Then, at an initial stage of the multiplex section, there is performed accumulation, i.e. addition of the electric charges that have been transferred by the first charge transfer row until a transfer time when the electric charges to be added to each other are transferred by the second charge transfer row comes.

The driving method for driving the solid-state image pick-up apparatus of the present invention is one for driving a solid-state image pick-up apparatus comprising: a first charge transfer row that transfers electric charges acquired by a first light-receiving pixel row; a second charge transfer row that transfers electric charges acquired by a second light-receiving pixel row; and a multiplex section that transfers the electric charges which have been transferred by the first charge transfer row and second charge transfer row toward an electric-charge/voltage conversion means. The driving method includes the steps of in the case of an alternately-output mode, applying signals in opposite phase to each other to a final stage of the first charge transfer row and a final stage of the second charge transfer row, respectively, and, in case of an add-and-output mode, applying to the final stage of the second charge transfer row a signal for accumulating the electric charges until a transfer time when the electric charges to be added to each other are transferred by the second charge transfer row comes.

In the above-described present invention, in the case of the add-and-output mode, there is applied to the final stage of the second charge transfer row a signal for accumulating the electric charges until a transfer time when the electric charges to be added to each other are transferred by the second charge transfer row comes. Therefore, before the final stage of the second charge transfer row there is performed accumulation, i.e. addition of the electric charges that have been transferred by the second charge transfer row. Also, while the signal is being applied to the final stage of the second charge transfer row, the electric charges that have been transferred on by the first charge transfer row are sent to the multiplex section. Then, at an initial stage of the multiplex section, there is performed accumulation, i.e. addition of the electric charges that have been transferred by the first charge transfer row until a transfer time when the electric charges to be added to each other are transferred by the second charge transfer row comes.

The image input apparatus of the present invention uses a solid-state image pick-up apparatus comprising: a first charge transfer row that transfers electric charges acquired by a first light-receiving pixel row; a second charge transfer row that transfers electric charges acquired by a second light-receiving pixel row; a multiplex section that transfers the respective electric charges which have been transferred by the first charge transfer row and second charge transfer row, toward an electric-charge/voltage conversion means; and signal generation means that, in case of an alternately-output mode, applies signals in opposite phase to each other to a final stage of the first charge transfer row and a final stage of the second charge transfer row and that, in case of an add-and-output mode, applies to the final stage of the second charge transfer row a signal for accumulating the electric charges until a transfer time when the electric charges to be added to each other are transferred by the second charge transfer row comes.

In the above-described present invention, in the case of the add-and-output mode, there is applied to the final stage of the second charge transfer row a signal for accumulating the electric charges until a transfer time when the electric charges to be added to each other are transferred by the second charge transfer row comes. Therefore, before the final stage of the second charge transfer row there is performed accumulation, i.e. addition of the electric charges that have been transferred by the second charge transfer row. Also, while the signal is being applied to the final stage of the second charge transfer row, the electric charges that have been transferred by the first charge transfer row to the multiplex section are sent. Then, at an initial stage of the multiplex section, there is performed accumulation, i.e. addition of the electric charges that have been transferred by the first charge transfer row until a transfer time when the electric charges to be added to each other are transferred by the second charge transfer row comes. As a result of this, it becomes possible to obtain an output image in which adjacent-pixel charges transferred by each of the respective charge transfer rows are added to each other.

BRIEF DESCRIPTION OF DRAWINGS

FIG. 4 is a timing chart illustrating the add-and-output mode.

BEST MODE FOR CARRYING OUT THE INVENTION

Figure 1:
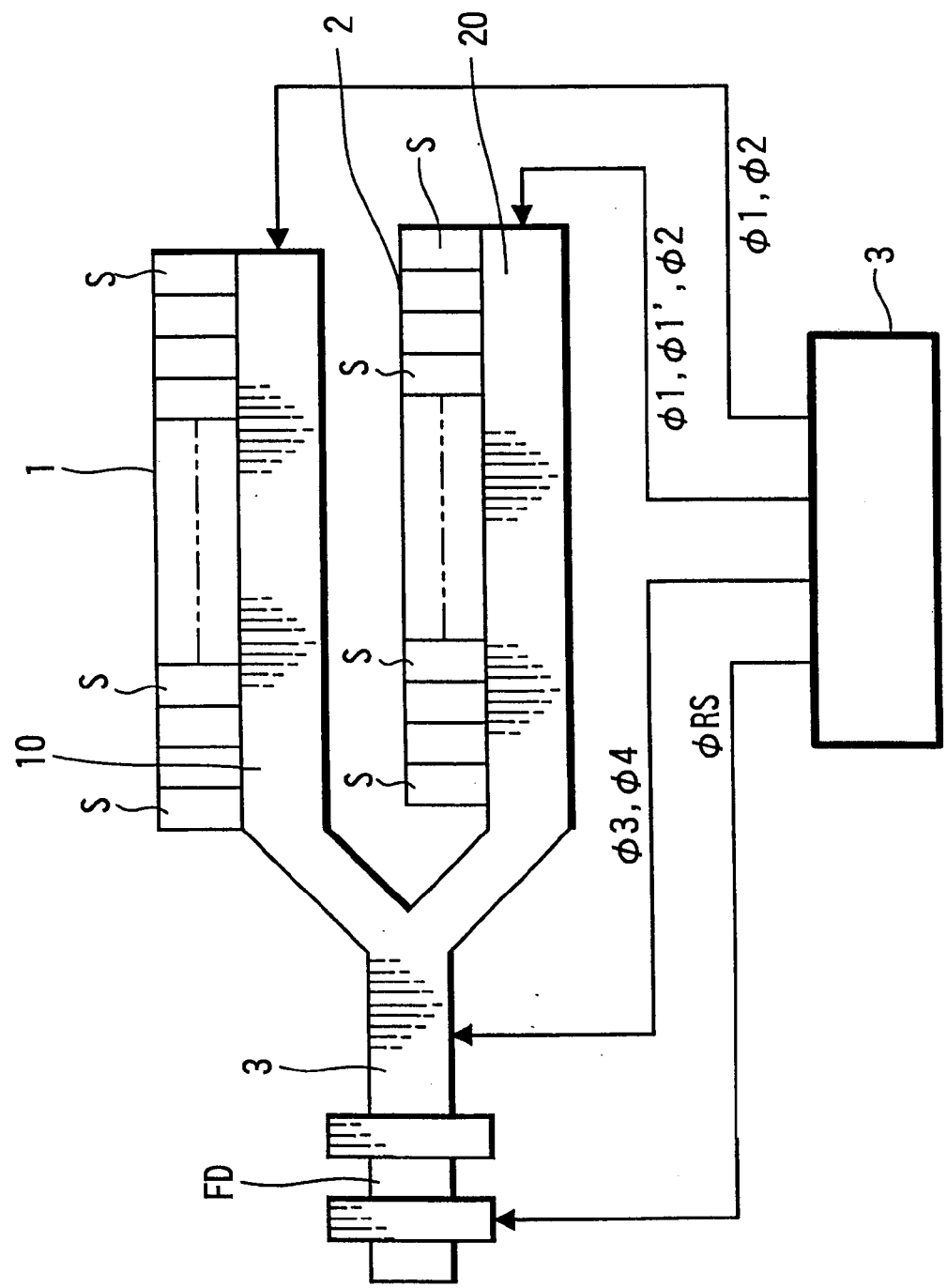
FIG. 1 is a schematic diagram illustrating a solid-state image pick-up apparatus according to an embodiment of the present invention.
Figure 2:
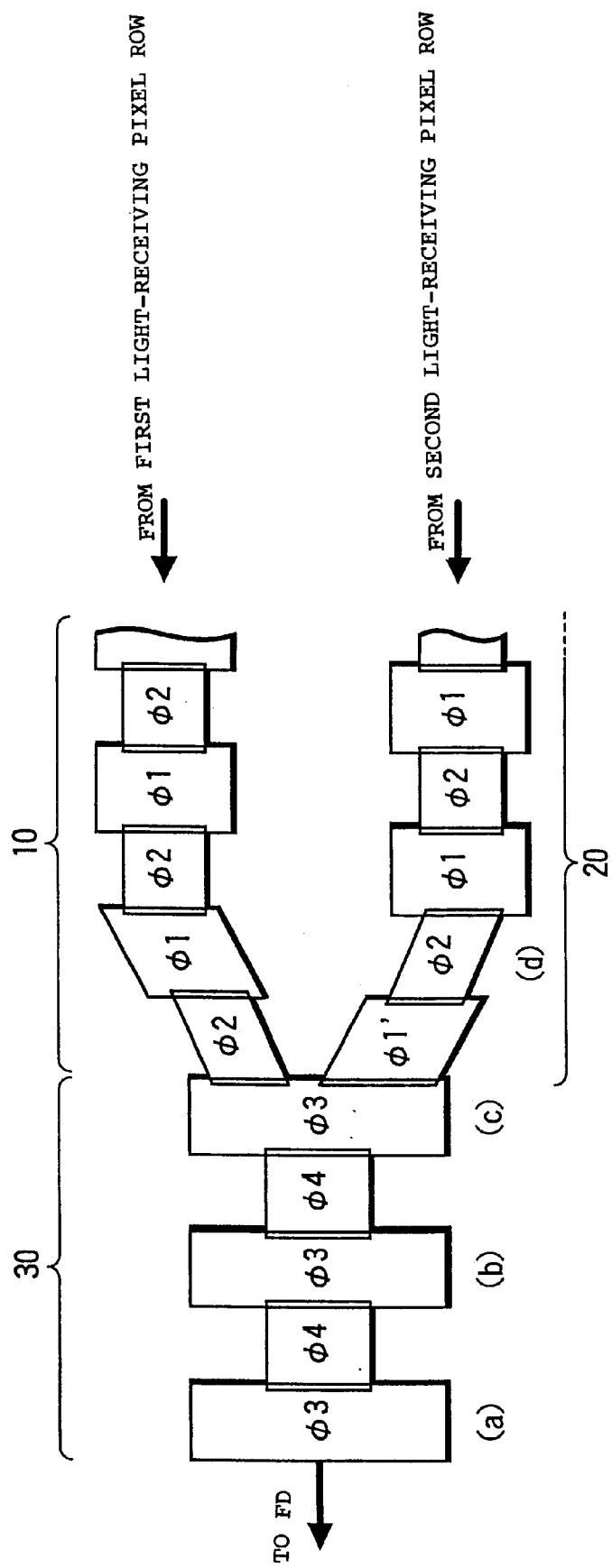
FIG. 2 is a schematic diagram illustrating a main part of a solid-state image pick-up apparatus according to an embodiment of the present invention.
Figure 3:
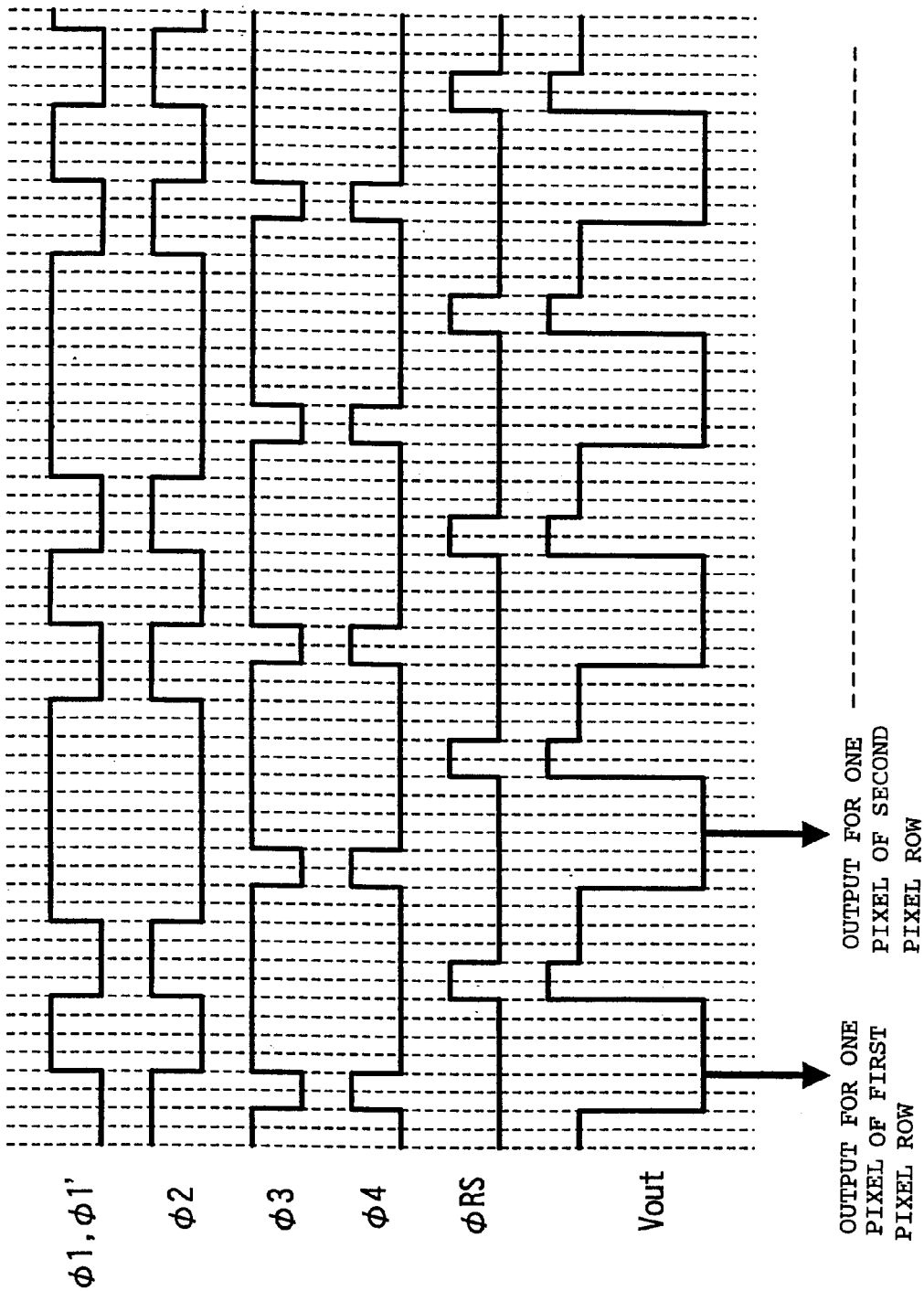
FIG. 3 is a timing chart illustrating the alternately-output mode.

An embodiment of a solid-state image pick-up apparatus, a driving method therefor, and an image input apparatus according to the present invention will be described below with reference to the drawings. FIG. 1 is a schematic diagram illustrating a solid-state image pick-up apparatus according to this embodiment; FIG. 2 is a schematic diagram illustrating a main part of the solid-state image pick-up apparatus according to this embodiment; and FIGS. 3 and 4 are timing charts illustrating a driving method of the solid-state image pick-up apparatus according to this embodiment.

As illustrated in FIG. 1, the solid-state image pick-up apparatus of this embodiment comprises a first CCD register 10 and a second CCD register 20 that are each provided correspondingly to two sensor rows, i.e. a first light-receiving pixel row and a second light-receiving pixel row and a multiplex section 30 that, depending on the relevant output mode, transfers each of the electric charges that have been transferred from the first CCD register 10 and second CCD register 20.

Transfer elements forming the first CCD register 10, second CCD register 20, and multiplex section 30 are each made so that the potential of part of the area on the side where electric charge is output may become higher than that of the remaining area.

Also, the solid-state image pick-up apparatus of this embodiment comprises signal generation means 3 for supplying a pulse signal to the first CCD register 10, second CCD register 20, multiplex section 30, etc. with predetermined timings.

This solid-state image pick-up apparatus has the two following output modes. One is an alternately-output mode in which the electric charge that has been individually acquired by respective two sensor rows is alternately transferred from the multiplex section 30, and then a floating diffusion amplifier FD that is connected thereto in the succeeding stage, there are alternately outputs the signals correspond to the respective electrical charges. The other is an add-and-output mode in which, of the electric charges acquired by the two sensor rows, the ones obtained from adjacent pixels in the same sensor row are added together and then outputted.

In other words, in this solid-state image pick-up apparatus, because the first light-receiving pixel row and second light-receiving pixel row forming the two rows of sensors are arranged in a manner of being displaced by a half pitch of the pixel. Alternately outputting the respective electric charges acquired by the two rows of sensors in the alternately output mode enables reading an image with a resolution twice the pitch of pixels of one row with regard to the direction of the pixel row.

On the other hand, in the add-and-output mode, the electric charges acquired from adjacent pixels in the same row are added to each other and the resulting signal is outputted. Therefore, reading of an image is performed with a resolution half the pitch of pixels of one row. However, because the already added electric charges are transferred to the floating diffusion amplifier FD, it is possible to obtain a signal output in which the electric charges of adjacent pixels are mutually added with the same timing as in the alternately-output mode.

When performing changeover of the above-described output modes in the solid-stage image pick-up apparatus of the embodiment, it is arranged that a pulse signal can be independently impressed to a final stage of the second CCD register 20. In accordance with the timing of impressing the pulse signal to that final stage, changeover of the output modes is performed.

Specifically, as illustrated in FIG. 2, in the solid-state image pick-up apparatus of this embodiment, the first CCD register 10 is alternately impressed with pulse signals consisting of Ø1 and Ø2, while the second CCD register 20 is alternately impressed with pulse signals of Ø2 and Ø1. Further, a pulse signal of Ø1' is independently impressed to the final stage of the second CCD register 20.

In accordance with the output time when these pulse signals are outputted from the signal generation means 3, changeover between the alternately-output mode and the add-and- output mode is performed. A description will be given below of the output time of the pulse signals in each output mode.

FIG. 3 is a timing chart in the case of the alternately-output mode. In the alternately-output mode, signals Ø1, Ø2 in opposite phases to each other are impressed to the first CCD register 10 and the second CCD register 20, respectively. Also, the same pulse signal Ø1' as the pulse signal Ø1 is impressed to the final stage of the second CCD register 20.

As a result, the transfer of electric charges acquired from the first light-receiving pixel row that is performed by the first CCD register 10 and the transfer of electric charges acquired from the second light-receiving pixel row by the second CCD register 20 are alternately performed.

Also, to the multiplex section 30, signals Ø3, Ø4 in opposite phases to each other are impressed. The signals Ø3, Ø4 each have a frequency twice that of the signals Ø1, Ø2. The electric charges obtained by the first light-receiving pixel row and the electric charges obtained by the second light-receiving pixel row, which are alternately transferred from the first CCD register 10 and the second CCD register 20, are sequentially transferred toward the floating diffusion amplifier FD.

This driving enables the following operation. During a time period in which a reset pulse signal ØRS is kept low in level from the stage at which the Ø3 has a low level and the Ø4 has a high level (until the reset pulse ØRS becomes high in level), a signal corresponding to one pixel of the first pixel row and a signal corresponding to one pixel of the second pixel row can alternately be outputted from the floating diffusion amplifier FD.

On the other hand, FIG. 4 is a timing chart in case of the add-and-output mode. In the add-and-output mode, the signals Ø1, Ø2 in opposite phases to each other are impressed to the first CCD register 10 and the second CCD register 20, respectively. Also, the pulse signal Ø1' impressed to the final stage of the second CCD register 20 is made to have a high level only once during a time period in which the Ø1 has a high level consecutively twice.

Specifically, in a time period indicated by the numeral ① in FIG. 4, the pulse signal Ø3 is made to have a high level, so that the electric charges corresponding to two adjacent pixels transferred from the first CCD register 10 according to the pulse signals Ø1, Ø2 are added to each other at a section (c) illustrated in FIG. 2. Thereafter, the Ø3 is made to have a high level → low level → high level (the Ø4 is made to have a low level → high level → low level). By doing so, it will be possible to transfer the previously added electric charges to a section (b) illustrated in FIG. 2.

Also, in the time period indicated by the numeral ①, the Ø1' is made to have a low level and the Ø1 is made to have a high level → low level → high level (the Ø2 is made to have a low level → high level → low level). By doing so, the electric charges corresponding to two adjacent pixels transferred from the second CCD register 20 are added to each other at a portion (d) illustrated in FIG. 2.

On the other hand, in a time period indicated by the numeral ② in FIG. 4, the Ø3 is made to have a high level → low level → high level (the Ø4 is made to have a low level → high level → low level). By doing so, the resulting electric charge obtained by adding to each other the electric charges from two adjacent pixels that have been transferred from the first CCD register 10 to the portion (b) illustrated in FIG. 2 are transferred to a portion (a).

Also, the Ø1' is made to have a low level → high level (during this period of time the Ø3 is made to have a high level). By doing so, the resulting electric charges corresponding to two adjacent pixels transferred from the second CCD register 20, and mutually added at the portion (d) in FIG. 2 are transferred to the portion (c) illustrated in FIG. 2.

Thereafter, the Ø3 is made to have a high level → low level → high level (the Ø4 is made to have a low level → high level → low level). By doing so, the electric charges obtained by adding to each other the electric charges from two adjacent pixels that have been transferred from the second CCD register 20 can be transferred to the portion (b) illustrated in FIG. 2.

This driving enables finally the floating diffusion amplifier FD, to alternately output correspondingly to the time period ① and the time period ② two-pixel added signal for the first light-receiving pixel row and two-pixel added signal for the second light-receiving pixel row in the order above mentioned.

The above-described solid-state image pick-up apparatus and its driving method are mainly applied to the image input apparatus such as a scanner or a copier. In this case, when a high resolution is required as in the case of taking a minute image, it is arranged to obtain the respective pixel outputs that have been acquired by the first light-receiving pixel row and the second light-receiving pixel row according to the previously described alternately-output mode. When there is a need to perform high-speed signal processing within a limited period of time as in the case of performing a pre-scan at the time of acquiring an image (reading for deciding the image size, the image area, etc.), it is arranged to alternately obtain the added output of adjacent two pixels of the first light-receiving pixel row and the added output of adjacent two pixels of the second light-receiving pixel row according to the previously described add-and-output mode. This makes it possible to cope with both the demands for high resolution and for high-speed processing by means of a single solid-state image pick-up apparatus.

Additionally, in the above-mentioned embodiment, the description has been given of the case of using a line sensor in which a plurality of pixels are arranged in rows. However, even in case of an area sensor in which a plurality of pixels are arranged in an area form (in a matrix form), the invention can also be applied thereto. Further, in the timing chart of the add-and-output mode illustrated in FIG. 4, it is also possible to adopt a method of performing thinning of the reset pulse ØRS from twice to once. By this thinning, it also becomes possible to obtain an output of four pixel added electric charge in total that is obtained by adding the electric charges of two adjacent pixels in the same sensor row to those of two adjacent pixels in a different sensor row.

INDUSTRIAL APPLICABILITY

As described above, the solid-state image pick-up apparatus, the driving method therefor, and the image input apparatus according to the present invention have the following advantages. With the multiplexing structure type of solid-state image pick-up apparatus, addition of the electric charges from adjacent pixels in the same light-receiving pixel row can be performed through a simple pulse change. Moreover, it is possible to cope with changeover of the output mode without making the circuit wiring, etc. complex. Furthermore, with the use of a single solid-state image pick-up apparatus, it is possible to cope with the demands both high resolution and high-speed signal processing and satisfy a wide variety of needs. As a result, it is possible in turn to reduce the manufacturing cost of the solid-state image pick-up apparatus that can cope with the demands both for high resolution and high-speed signal processing.

What is claimed is:

1. A solid-state image pick-up apparatus comprising:
   a first charge transfer row for transferring electric charges acquired by a first light-receiving pixel row;
   a second charge transfer row for transferring electric charges acquired by a second light-receiving pixel row;
   a multiplex section for transferring the respective electric charges transferred from the first charge transfer row and second charge transfer row toward an electric-charge/voltage conversion means; and
   signal generation means for, in case of an alternately-output mode, applying signals in opposite phase to each other to a final stage of the first charge transfer row and a final stage of the second charge transfer row, respectively, and for, in case of an add-and-output mode, applying to the final stage of the second charge transfer row a signal for accumulating the electric charges until a transfer time when the electric charges to be added to each other are transferred by the second charge transfer row comes.

2. A driving method for driving a solid-state image pick-up apparatus, comprising:
   a first charge transfer row for transferring electric charges acquired by a first light-receiving pixel row; a second charge transfer row for transferring electric charges acquired by a second light-receiving pixel row; and a multiplex section for transferring the respective electric charges, transferred from the first charge transfer row and second charge transfer row toward an electric-charge/voltage conversion means, the driving method being characterized by including the steps of
   in case of an alternately-output mode, applying signals in opposite phase to each other to a final stage of the first charge transfer row and a final stage of the second charge transfer row, respectively, and
   in the case of an add-and-output mode, applying to the final stage of the second charge transfer row a signal for accumulating the electric charges until a transfer timing with which the electric charges to be mutually added to each other are transferred by the second charge transfer row comes.

3. An image input apparatus, wherein
   a solid-state image pick-up apparatus that comprising a first charge transfer row for transferring electric charges acquired by a first light-receiving pixel row, a second charge transfer row that transfers electric charges acquired by a second light-receiving pixel row, a multiplex section for transferring the respective electric charges, transferred from the first charge transfer row and second charge transfer row, toward an electric-charge/voltage conversion means, and signal generation means that in the case of an alternately-output mode, applying signals in opposite phase each other to a final stage of the first charge transfer row and a final stage of the second charge transfer row, respectively, and for, in case of an add-and-output mode, applying to the final stage of the second charge transfer row a signal for accumulating the electric charges until a transfer time when the electric charges to be added to each other are transferred by the second charge transfer row comes is used.

* * * * *